March 31, 1942.   J. H. OXLEY   2,277,992
CRAYON
Filed May 29, 1940

INVENTOR.
John H Oxley
BY Robert W. Wilson
ATTORNEY

Patented Mar. 31, 1942

2,277,992

UNITED STATES PATENT OFFICE 2,277,992

CRAYON

John H. Oxley, Watertown, Mass., assignor to The American Crayon Company, Sandusky, Ohio, a corporation of Ohio Application May 29, 1940, Serial No. 337,821

8 Claims. (Cl. 120—83)

My invention relates to a new and improved crayon of wax, pressed or cast chalk, or of other solid writing or marking material.

The principal object of the invention is to produce a crayon which will not soil the fingers in use. Secondary objects are to attain the principal object without scratching or injuring the writing surface and without increasing the difficulty of erasing the crayon marks from the writing surface. A still further object is to increase the strength of the crayon without detracting from its writing qualities.

In its broadest aspect my invention comprises a crayon coated with rubber or rubber-like material, whether natural or artificial. For ease in rapid and uniform application to the crayon I recommend a liquid form of the coating material which may be applied by dipping, brushing or spraying. Such liquid forms of rubber or like material may be solutions in organic solvent, aqueous dispersions of such solutions, or aqueous dispersions, whether natural or artificial, of the material itself.

Figure 1:
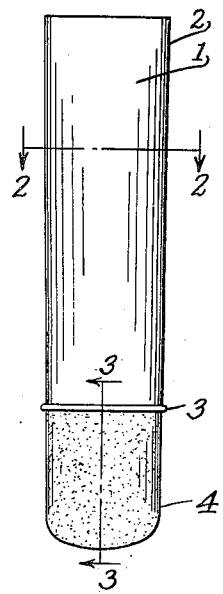
Fig. 1 is a side elevation of my invention as applied to a crayon.
Figure 2:
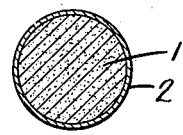
Fig. 2 is a transverse section on plane 2—2 of Fig. 1, with the thickness of the coating relatively exaggerated.
Figure 3:
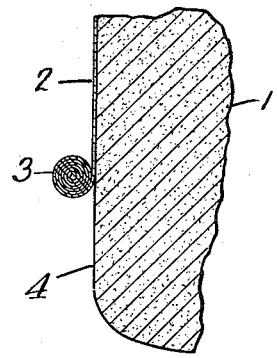
Fig. 3 is an enlarged fragmentary vertical section on the plane 3—3 of Fig. 1.

Figs. 1, 2 and 3 illustrate a crayon 1 with a coating 2 which can be rolled back as at 3, exposing a writing tip 4.

A vulcanized coating is generally preferred and although the coating material may be vulcanized before, during or after application to the crayon, it is more satisfactory to vulcanize it before.

Without limiting the generality of the foregoing, I specifically recommend a vulcanized latex as the material best fitted for producing my new and improved coated crayons at the lowest cost and with the simplest equipment.

By "vulcanized latex" I mean a latex in which the rubber particles have been vulcanized to the point where the coagulum produced by chloroform is visually different in composition and texture from the chloroform coagulum of natural or raw latex, quite regardless of whether further vulcanization of the rubber particles may be effected before, during or after coagulation.

For a coating 2 I recommend the use of vulcanized latex containing from approximately 15 to 60% of rubber solids. Whether made from a low or high concentration of latex, the coat 2 is, however, thick enough to be rolled back on itself in the form of a ring 3 to expose fresh portions of the writing material as at 4. If a rubber dispersion of from approximately 20 to 60% concentration is used, the resulting coating will in addition be thick enough to protect the crayon against accidental breakage or to prevent scattering of the broken pieces if the crayon should break.

Thin dried latex coatings are apt to flake off and thick coatings to blister. It is therefore desirable to use adhesive with the latex. It is also preferable to use a stiffening agent for the rubber as this facilitates the rolling back of coatings. Both adhesion and greater stiffness may be secured with certain adhesives such as casein, starch, glue, gelatin, dextrin, shellac, copal, gum dammar, gum arabic, tragacanth, cumarone resins of relatively high softening point, that is, resins which are not plastic at ordinary temperatures, and the like. Such adhesives will be hereinafter called stiffening adhesives. Such stiffening adhesives should be used when it is desired to have a clear, transparent coating through which the user may readily observe the color of the chalk and any trade or other identifying marks impressed thereon. Of these stiffening adhesives casein is preferred.

Adhesives such as rosin, Canada balsam, gum elemi or cumarone resins of low softening point may be used with latex. However, they produce no stiffening effect and also impart some tackiness to the coat. Tackiness may be overcome by treatment of the coated chalk with a dusting agent such as talc, or the use of waxes such as paraffin, carnauba, ceresin and montan with the adhesive. Greater stiffness may be secured by using fillers such as whiting, clay, titanium dioxide, zinc oxide, barytes and the like, which will also reduce the tackiness imparted by the resin. Such adhesive should generally not exceed 50% based on the rubber, for a larger amount will tend to stiffen the rubber to the point where it cannot easily be rolled back.

For dried latex coats, the minimum content of stiffening adhesive is about 0.5% based on the rubber.

For dried latex coats the range for non-stiffening adhesive such as rosin would generally be from a minimum of 0.25% to a maximum of 25% based on the rubber.

Fillers, when desired, may be used in amounts up to 100% based on the rubber or possibly more. In addition any of the usual latex compounding materials may be used.

All percentages given are figured on a dry basis.

As specific and preferred examples of the coating compounds useful in practicing my invention are the following: Vulcanized latex containing approximately from 30 to 40% of rubber solids admixed with ammoniacal casein in approximate amounts from 0.5 to 20% based on the rubber (dry basis). The resulting coat is clear and transparent.

The whole crayon may be coated if desired, but usually it is preferable not to coat the writing tip 4 itself. When crayons are coated by dipping in a single dip as herein recommended, there will always be some portion of the crayon uncoated where the chalk-holding means has retained the chalk.

A coat may also be formed in any one of the well known ways, as for example on a dipping form of approximately the size and shape of the crayon to be covered. After formation of the protective coat in this way the deposit, after removal from the form, may then be applied as such to the crayon.

In the appended claims the term "rubber" shall include rubber and rubber-like materials, whether natural or artificial.

I claim:

1. A crayon having a substantial portion of its exterior surface coated with a thick rollable coating of rubber containing an adhesive, the writing tip of said crayon being exposed.

2. A crayon having a substantial portion of its exterior surface coated with a thick rollable latex coating containing an adhesive and a stiffening agent, the writing top of said crayon being exposed.

3. A crayon carrying on a substantial portion of its exterior surface a thick, rollable coating comprising the dried residue of an aqueous dispersion of rubber containing approximately from 15 to 60% of rubber solids.

4. A crayon carrying on a substantial portion of its exterior surface a thick, rollable coating comprising the dried residue of an aqueous dispersion of rubber containing approximately from 15 to 60% of rubber solids and adhesive in approximate amounts of from 0.5% to 50% based on the rubber (dry basis).

5. A crayon carrying on a substantial portion of its exterior surface a thick, rollable coating comprising the dried residue of vulcanized latex containing approximately from 30 to 40% of rubber solids and casein in approximate amounts from 0.5 to 20% based on the rubber (dry basis).

6. As an article of manufacture a chalk crayon having thereon a coating of vulcanized latex formed thereon by dipping in liquid latex, said coating being adapted to be rolled back.

7. As an article of manufacture a chalk crayon having formed in place thereon a coating of mixed vulcanized latex and adhesive, said coating being adhered to said chalk by said adhesive and adapted to be rolled back on itself.

8. As an article of manufacture a chalk crayon having a coating of vulcanized latex formed in place on the entire body of said crayon except the tip, said coating being of a plurality of thicknesses mutually more coherent than adherent to the chalk, whereby said coating can be rolled back to expose the chalk.

JOHN H. OXLEY.